United States Patent
Zhang et al.

(10) Patent No.: US 10,070,110 B2
(45) Date of Patent: Sep. 4, 2018

(54) AUTOMATIC WHITE BALANCE

(71) Applicant: ZHEJIANG UNIVIEW TECHNOLOGIES CO., LTD, Hangzhou (CN)

(72) Inventors: De Zhang, Hangzhou (CN); Duoming Chen, Hangzhou (CN)

(73) Assignee: Zhejiang Uniview Technologies Co., Ltd, Hangzhou (CN)

( * ) Notice: Subject to any disclaimer, the term of this patent is extended or adjusted under 35 U.S.C. 154(b) by 0 days.

(21) Appl. No.: 15/368,133

(22) Filed: Dec. 2, 2016

(65) Prior Publication Data

US 2017/0195648 A1    Jul. 6, 2017

(30) Foreign Application Priority Data

Dec. 30, 2015   (CN) .......................... 2015 1 1024504

(51) Int. Cl.
| | |
|---|---|
| *H04N 9/73* | (2006.01) |
| *G06K 9/62* | (2006.01) |
| *H04N 7/18* | (2006.01) |
| *H04N 1/60* | (2006.01) |

(52) U.S. Cl.
CPC ............. *H04N 9/73* (2013.01); *G06K 9/6218* (2013.01); *H04N 1/6077* (2013.01); *H04N 7/183* (2013.01); *H04N 9/735* (2013.01)

(58) Field of Classification Search
None
See application file for complete search history.

(56) References Cited

U.S. PATENT DOCUMENTS

| | | | |
|---|---|---|---|
| 8,854,709 B1 | 10/2014 | Liu et al. | |
| 2008/0101690 A1 | 5/2008 | Hsu et al. | |
| 2009/0097745 A1 | 4/2009 | Kim et al. | |
| 2009/0102944 A1 | 4/2009 | Nishizawa | |

FOREIGN PATENT DOCUMENTS

| | | |
|---|---|---|
| CN | 103297789 A | 9/2013 |
| CN | 103929632 A | 7/2014 |
| CN | 104618702 A | 5/2015 |
| CN | 104702941 A | 6/2015 |

OTHER PUBLICATIONS

European Patent Office, Extended European Search Report Issued in Application No. 16203411.0, May 22, 2017, Germany, 7 pages.

*Primary Examiner* — Stephen Coleman
(74) *Attorney, Agent, or Firm* — McCoy Russell LLP

(57) ABSTRACT

According to examples of the present disclosure, a method and apparatus for automatic white balance may be provided. A white region for performing automatic white balance may be obtained by a front end device of a video monitoring system. At least one cluster may be generated by clustering statistical points within the white region of a to-be-detected image by the front end device. The cluster may be determined as a target cluster and statistical points within the target cluster may be determined as white points by the front end device when the number of statistical points within the cluster is greater than a preset threshold. And a white balance gain of the to-be-detected image may be determined by the front end device based on the target cluster.

13 Claims, 8 Drawing Sheets

AUTOMATIC WHITE BALANCE

CROSS-REFERENCE TO RELATED APPLICATIONS

The present application claims priority to Chinese Patent Application No. 201511024504.8, filed on Dec. 30, 2015, the entire contents of which are hereby incorporated by reference for all purposes.

TECHNICAL FIELD

The present disclosure generally relates to the field of image processing technologies.

BACKGROUND

Light visible to human eyes may consist of light spectrums of seven colors upon superposition, and human visual perception to the same color is basically the same under different illuminations. For example, a white object may look like white in the morning light as the sun rises; and it may still look like white under the faint light at night. This is because human brains have been adapted to color rendition of an object under different lighting conditions.

However, a front end device of a video monitoring system, such as an analog camera, a network camera or a digital camera, may not have the adaptability of human eyes. Since light of different color temperatures may have different color components, in allusion to the same object, colors of an image captured by the front end device may likely be different under illumination by light of different color temperatures. Specifically, the front end device may capture an image for an object, which includes three color components, namely Component R (red), Component G (green) and Component B (blue). However, colors of the image finally obtained may likely appear not to be consistent as the object actually seems, due to impacts of the color of the object itself, color temperature of ambient light, and photosensitive properties of optical filters and sensors on various color components, etc. To ensure the colors of the image captured by the front end device furthest close to human visual perception, image processing such as white balance may be performed on the captured image.

SUMMARY

One aspect of the present disclosure provides a method for automatic white balance, including:

obtaining, by a front end device of a video monitoring system, a white region for performing automatic white balance;

generating, by the front end device, at least one cluster by clustering statistical points within the white region of a to-be-detected image;

in case that the number of statistical points within one of said clusters is greater than a preset threshold, determining, by the front end device, the cluster as a target cluster, and determining, by the front end device, the statistical points within the target cluster as white points; and determining, by the front end device, a white balance gain of the to-be-detected image based on the target cluster.

The white region may include a plurality of sub-regions, and clustering the statistical points within the white region of the to-be-detected image may include:

determining, by the front end device, the number of statistical points within each of the sub-regions; and generating, by the front end device, at least one cluster from the plurality of sub-regions according to a density-based spatial clustering algorithm which takes a center of each of the sub-regions as a clustering object and takes the number of statistical points within each of the sub-regions as a density of the clustering object.

The determining a white balance gain of the to-be-detected image based on the target cluster may include:

obtaining, by the front end device, a clustering feature of the target cluster and tricolor information of statistical points within the target cluster;

allocating, by the front end device, a weight value for the statistical points within the target cluster according to the clustering feature; and determining, by the front end device, the white balance gain of the to-be-detected image with the weight value and the tricolor information of the statistical points within the target cluster.

The allocating a weight value for the statistical points within the target cluster according to the clustering feature may include:

in case that the clustering feature indicates there is only one target cluster within the white region, allocating, by the front end device, an identical weight value for the statistical points within the target cluster; and in case that the clustering feature indicates there are at least two target clusters within the white region, allocating, by the front end device, weight values for the statistical points within the target clusters according to a weighting parameter, such that the statistical points within the same target cluster have the same weight value and the statistical points within different target clusters have different weight values.

The weighting parameter may include one or more of the followings:

the number of statistical points within a cluster;

a color temperature corresponding to a center position of the cluster; and a distance relation between the center position of the cluster and a blackbody locus curve.

The allocating weight values for the statistical points within the target clusters according to a weighting parameter may include:

allocating, by the front end device, a larger weight value for the statistical points within a target cluster as there are more statistical points within the target cluster;

allocating, by the front end device, a larger weight value for the statistical points within a target cluster as the color temperature corresponding to the center position of the target cluster becomes closer to a common color temperature section of a light source; and allocating, by the front end device, a larger weight value for the statistical points within a target cluster as the center position of the target cluster becomes nearer to the blackbody locus curve.

The tricolor information of the statistical point may include: a response value of Component G, a response value of Component R and a response value of Component B of the statistical point.

The determining the white balance gain of the to-be-detected image with the weight value and the tricolor information of the statistical points within the target cluster may include:

determining, by the front end device, an R channel gain CrAvg of the to-be-detected image according to a following formula:

$$CrAvg = \frac{\sum Cr(i) \times W(i)}{\sum W(i)};$$

determining, by the front end device, a B channel gain CbAvg of the to-be-detected image according to a following formula:

$$CbAvg = \frac{\sum Cb(i) \times W(i)}{\sum W(i)};$$

assigning, by the front end device, a numerical value to a G channel gain CgAvg of the to-be-detected image; wherein
i denotes an $i^{th}$ statistical point within a cluster,
W(i) denotes the weight value of the $i^{th}$ statistical point,
Cr(i) denotes a value obtained by dividing the response value of Component G of the $i^{th}$ statistical point by the response value of Component R of the $i^{th}$ statistical point, and
Cb(i) denotes a value obtained by dividing the response value of Component G of the $i^{th}$ statistical point by the response value of Component B of the $i^{th}$ statistical point.

Another aspect of the present disclosure may provide an apparatus for automatic white balance, including a processor and a non-transitory storage medium storing machine-executable instructions corresponding to a control logic for automatic white balance, where by executing the machine-executable instructions the processor may be caused to:
obtain a white region for performing automatic white balance;
generate at least one cluster by clustering statistical points within the white region of a to-be-detected image;
in case that the number of statistical points within one of said clusters is greater than a preset threshold,
determine the cluster as a target cluster, and
determine the statistical points within the target cluster as white points; and
determine a white balance gain of the to-be-detected image based on the target cluster.

The white region may include a plurality of sub-regions, and when clustering the statistical points within the white region of a to-be-detected image falling, the machine-executable instructions further cause the processor to:
determine the number of statistical points within each of the sub-regions; and
generate at least one cluster from the plurality of sub-regions according to a density-based spatial clustering algorithm which takes a center of each of the sub-regions as a clustering object and takes the number of statistical points within each of the sub-regions as a density of the clustering object.

When determining the white balance gain of the to-be-detected image based on the target cluster, the machine-executable instructions further cause the processor to:
obtain a clustering feature of the target cluster and tricolor information of statistical points within the target cluster;
allocate a weight value for the statistical points within the target cluster according to the clustering feature; and
determine the white balance gain of the to-be-detected image with the weight value and the tricolor information of the statistical points within the target cluster.

When allocating the weight value for the statistical points within the target cluster according to the clustering feature, the machine-executable instructions further cause the processor to:
in case that the clustering feature indicates there is only one target cluster within the white region,
allocate an identical weight value for the statistical points within the target cluster; and
in case that the clustering feature indicates there are at least two target clusters within the white region,
allocate weight values for the statistical points within the target clusters according to a weighting parameter, such that the statistical points within the same target cluster have the same weight value and the statistical points within different target clusters have different weight values.

The weighting parameter may include one or more of the followings:
the number of statistical points within a cluster;
a color temperature corresponding to a center position of the cluster; and
a distance relation between the center position of the cluster and a blackbody locus curve.

When allocating weight values for the statistical points within the target clusters according to the weighting parameter, the machine-executable instructions further cause processor to:
allocate a larger weight value for the statistical points within a target cluster as there are more statistical points within the target cluster;
allocate a larger weight value for the statistical points within a target cluster as the color temperature corresponding to the center position of the target cluster becomes closer to a common color temperature section of a light source; and
allocate a larger weight value for the statistical points within a target cluster as the center position of the target cluster becomes nearer to the blackbody locus curve.

The tricolor information of the statistical points may include: a response value of Component G, a response value of Component R and a response value of Component B of the statistical point.

When determining the white balance gain of the to-be-detected image with the weight value and the tricolor information of the statistical points within the target cluster, the machine-executable instructions further cause the processor to:
determine an R channel gain CrAvg of the to-be-detected image according to a following formula:

$$CrAvg = \frac{\sum Cr(i) \times W(i)}{\sum W(i)};$$

determine a B channel gain CbAvg of the to-be-detected image according to a following formula:

$$CbAvg = \frac{\sum Cb(i) \times W(i)}{\sum W(i)};$$

assign a numerical value to a G channel gain CgAvg of the to-be-detected image; wherein
i may denote an $i^{th}$ statistical point within a cluster, W(i) may denote the weight value of the $i^{th}$ statistical point, Cr(i) may denote a value obtained by dividing the response value of Component G of the $i^{th}$ statistical point by the response value of Component R of the $i^{th}$ statistical point, and Cb(i) may denote a value obtained by dividing the response value of Component G of the $i^{th}$ statistical point by the response value of Component B of the $i^{th}$ statistical point.

Based on the foregoing technical solution, in the examples of the present disclosure, by clustering statistical points within the white region, interfering points may be effectively separated from white points and the interfering points may be determined as non-white points. In this way, the interfering points falling within the white region may be eliminated. When determining the white balance gain, an adverse effect of the interfering points on the white balance may be eliminated. And an adverse effect of local colorized sceneries and multisource light supplement, moving objects, and mixed color temperatures or the like on the white balance may be eliminated. Thus, the automatic white balance may be applicable to complex scenes where the local colorized sceneries and the multisource light supplement, and moving colorized objects and mixed color temperatures or the like are present. In this way, a precision and stability in automatic white balance processing in complex scenes may be improved.

DETAILED DESCRIPTION

White balance may be popularly understood as: when displaying a white object as an image, the displayed image is made still look like white. A process for adjusting white balance may be referred to a white balance adjustment, and automatic white balance (AWB) may be one of important manners for a white balance adjustment. The AWB generally may be configured by default in a front end device, and by adjusting tricolor components (red, green and blue) of the image, the AWB may allow the original white part to be still displayed as white.

According to a prior-knowledge-based AWB algorithm, one white region may be predetermined, statistical points falling within the white region may be taken as white points, and statistical points outside the white region may be taken as non-white points. Based on such a manner, if a statistical point is determined to be a white point, an actual color of an object corresponding to the statistical point may be considered to be white.

However, in actual application scenarios, due to interferences such as variation of color temperatures of a light source, light supplement of a plurality of light sources, local colorized sceneries and so on, statistical points falling within the white region may be not white points, and a colored region may be taken as a white point for calculation, thereby causing color cast of white balance. For example, there is a yellow object outdoors on a sunny day, and when the yellow object is taken as a white point at a low color temperature, this may cause white regions to look bluish and yellow regions to look whitish.

Figure 1A:
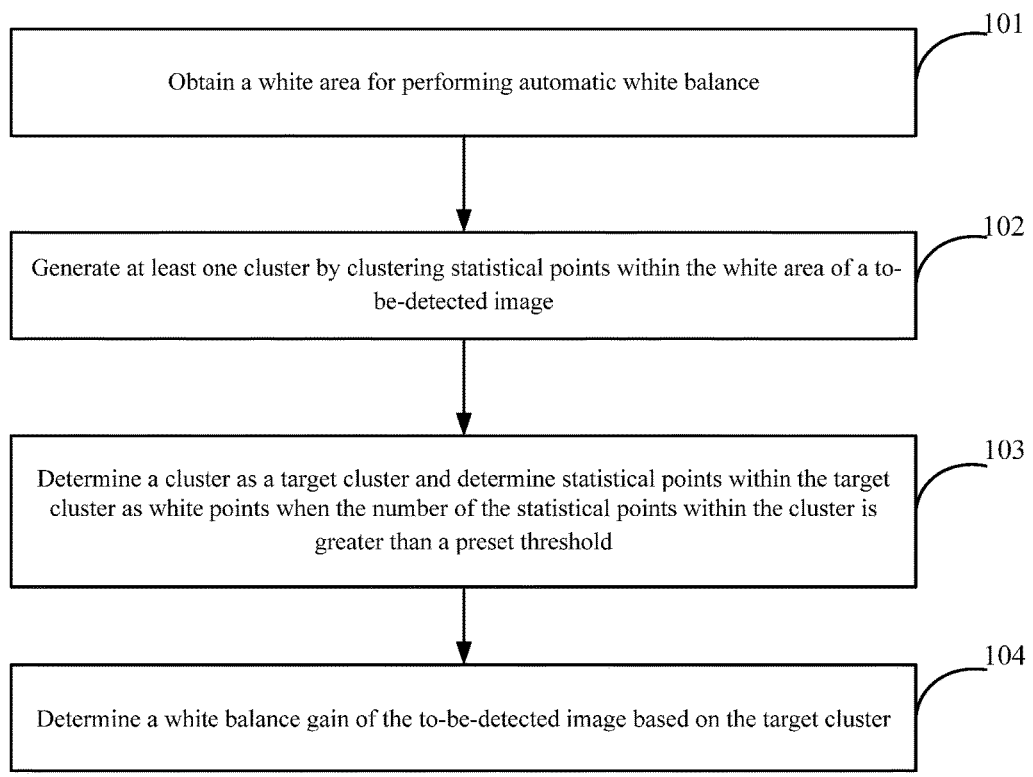
FIG. 1A is a flowchart of a method for automatic white balance according to one example of the present disclosure.

The examples of the present disclosure propose a method for automatic white balance (AWB), which may be applied to a front end device of a video monitoring system, such as an analog camera, a network camera or a digital camera. For example, the method may be applied to an image sensor of the network camera. As shown in FIG. 1A, the method for automatic white balance specifically may include following blocks.

At block 101, a white region for performing automatic white balance may be obtained.

At block 102, at least one cluster may be clustered by clustering statistical points within the white region of a to-be-detected image.

At block 103, in case that the number of statistical points within one of the clusters is greater than a preset threshold, the cluster may be determined as a target cluster and statistical points falling within the target cluster may be determined as white points.

At block 104, a white balance gain of the to-be-detected image may be determined based on the target cluster.

Figure 1B:
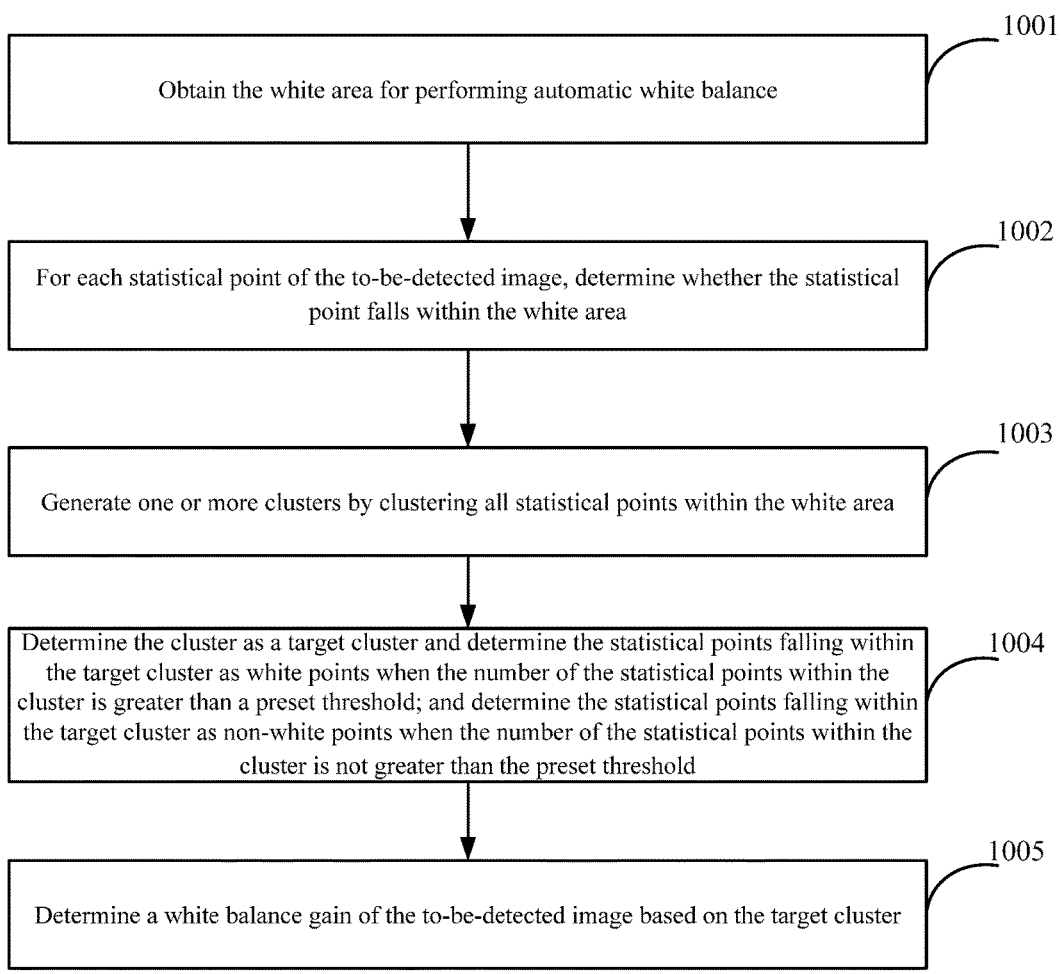
FIG. 1B is a flowchart of a method for automatic white balance according to one example of the present disclosure.

According to the method for automatic white balance of the present disclosure, interfering points may be effectively separated from white points by clustering statistical points falling within the white region, thereby eliminating an adverse effect of the interfering points on the white balance. Implementations of each block in FIG. 1A may be specifically described with reference to FIG. 1B.

At block 1001, the white region for performing automatic white balance may be obtained.

To determine whether actual colors of objects corresponding to the statistical points are white, a white region may be drawn in a coordinate system, and a statistical point may be considered to be a white point if the statistical point falls within the white region. The coordinate system may be a G/R-G/B coordinate system or an r-b coordinate system, and hereinafter, the r-b coordinate system may be taken as an example, where meanings of the r and the b will be explained in the following. In practical application, all white point responses of a light source conforming to a blackbody radiation curve may be manifested as basically falling on one curve (namely the blackbody locus curve) in the r-b coordinate system, and two ends of the curve may respectively represent an region where a color temperature is higher and an region where a color temperature is lower. Based on this, a statistical point having a smaller distance from the curve may be considered to be a white point. Since neither position nor shape of the curve is fixed, it is unable to represent the curve by using an effective mathematical expression, and thus it is difficult to draw a white region by using a distance from statistical points to the curve.

On this basis, in an example of the present disclosure, a plurality of white sub-regions may be drawn along a color temperature variation direction, wherein each white sub-region may be a polygon. For convenience of description, reference may be made by taking an example in which a white sub-region is a quadrilateral in subsequent description, and a plurality of white sub-regions may constitute the white region. In this way, a corresponding white region may be drawn. A white sub-region shaped like a quadrilateral may be drawn by using two pairs of straight lines whose slopes are respectively positive and negative. If a value of one statistical point falls within the quadrilateral, it is considered that the statistical point falls within the white sub-region, namely falls within the white region. Further, a circumscribed quadrilateral corresponding to the white sub-region may also be drawn, the circumscribed quadrilateral may consist of two horizontal straight lines and two perpendicular straight lines. When a statistical point falls between the two horizontal straight lines and falls between the two perpendicular straight lines, namely when the statistical point falls within the circumscribed quadrilateral, it may be determined whether the statistical point falls within the quadrilateral of the white sub-region. When a statistical point does not fall between the two horizontal straight lines and/or does not fall between the two perpendicular straight lines, namely when the statistical point does not fall within the circumscribed quadrilateral, it may be directly determined that the statistical point does not fall within the quadrilateral of the white sub-region.

One feasible manner for obtaining the white region of automatic white balance may include but is not limited to following treatments.

Treatment 1: N standard grey scale images having different color temperatures, under a light source conforming to blackbody radiation characteristics, may be captured, and tricolor information of each standard grey scale image may be obtained. Generally a value of the N may be a positive integer greater than or equal to 3. In practical application, besides grey scale images, other types of images may also be captured. For example, images captured in outside luminous environment may be obtained, which will not be described. Hereinafter, standard grey scale images under a light source conforming to the blackbody radiation characteristics may be taken as examples.

N standard grey scale images (namely, images outputted from an image sensor) of a gray object having different color temperatures, under a light source conforming to the blackbody radiation characteristics, may be captured, so that a corresponding blackbody locus curve may be fitted by using the tricolor information of the N captured standard grey scale images. A unit of a color temperature (Tc) is Kelvin (K). The higher the color temperature is, the more the short-wave components are; the more inclined to blue-green the images are, the lower the color temperature is; and the more the long-wave components are, the more inclined to red-yellow the images are. The color temperature may only indicate spectral components of the light source but may not indicate a luminous intensity. The color temperature of the light source may be determined by comparing its color with a theoretical thermal blackbody radiation. A Kelvin temperature obtained when a thermal blackbody radiator is matched with the color of the light source may be the color temperature of the light source, which is associated with the Planck's law.

Supposing the value of the N is 5, standard grey scale images whose color temperatures (Tcs) are 3,000K, 4,000K, 5,000K, 6,000K and 7,000K may be captured.

In a colorimetric system, relative proportions of tricolors (namely R, G and B) in R+G+B totals may be referred to as chromaticity coordinates, which may be respectively denoted by r, g and b. In the examples of the present disclosure, the tricolor information may be denoted by any two of an r value, a b value and a g value. Based on this, the tricolor information of a standard grey scale image may be obtained in the following way. Statistical average values respectively for an R component, a B component and a G component of the standard grey scale image may be determined. The r value may be calculated as the average value for the R Component/(the average value for the R component+the average value for the G component+the average value for the B component), namely $$r = \frac{R}{R+G+B}.$$

The b value may be calculated as the average value for the B component/(the average value for the R component+the average value for the G component+the average value for the B component), namely $$b = \frac{B}{R+G+B}.$$

The g value may be calculated as the average value for the G component/(the average value for the R component+the average value for the G component+the average value for the B component), namely $$g = \frac{G}{R+G+B} = 1 - r - b.$$

Further, the r value and the b value may be determined as the tricolor information, or the r value and the g value may be determined as the tricolor information, or the b value and the g value may be determined as the tricolor information. It is to be noticed that the manner for denoting the tricolor information and the manner for obtaining the tricolor information as set forth herein are merely for exemplary purposes, and are not restrictive.

In practical application, the treatment of the tricolor information being the r value and the b value, the treatment of the tricolor information being the r value and the g value, and the treatment of the tricolor information being the b value and the g value are the same. For convenience of description, reference may be made by taking the tricolor information being the r value and the b value as an example in the following.

When obtaining the tricolor information of five standard grey scale images, it is assumed that the r value is 0.6 and the b value is 0.2 in allusion to a standard grey scale image whose color temperature (Tc) is 3,000K. It is assumed that the r value is 0.5 and the b value is 0.25 in allusion to a standard grey scale image whose color temperature (Tc) is 4,000K. It is assumed that the r value is 0.4 and the b value is 0.3 in allusion to a standard grey scale image whose color temperature (Tc) is 5,000 K. It is assumed that the r value is 0.3 and the b value is 0.4 in allusion to a standard grey scale image whose color temperature (Tc) is 6,000 K; and it is assumed that the r value is 0.2 and the b value is 0.7 in allusion to a standard grey scale image whose color temperature (Tc) is 7,000 K.

Treatment 2: a blackbody locus curve may be fitted by using N different color temperatures and the tricolor information corresponding to each color temperature (namely, the tricolor information of standard grey scale images corresponding to the N color temperatures).

Points at a middle section of the blackbody locus curve (also referred to as a Planckian curve) may indicate positions for colorimetric values where human eyes may sense white light, wherein a high color temperature section is cold white and a low high color temperature section is warm white. Therefore, points falling within a certain distance from the blackbody locus curve may be taken as white points. Based on this principle, in the examples of the present disclosure, the blackbody locus curve may need to be fitted so as to perform automatic white balance.

In the examples of the present disclosure, the process of fitting the blackbody locus curve by using N different color temperatures and the tricolor information corresponding to each color temperature specifically may include but is not limited to: selecting two pieces of information from the tricolor information as an abscissa and an ordinate respectively. In this coordinate system, N sampling points may be obtained by drawing one sampling point at a coordinate position corresponding to each piece of tricolor information, wherein each sampling point may represent a color temperature corresponding to the tricolor information. Afterwards, one blackbody locus curve may be fitted out by using the N sampling points.

For example, the r value in the tricolor information may be taken as an abscissa and the b value may be taken as an ordinate, or the b value in the tricolor information may be taken as an abscissa and the r value may be taken as an ordinate.

Figure 2A:
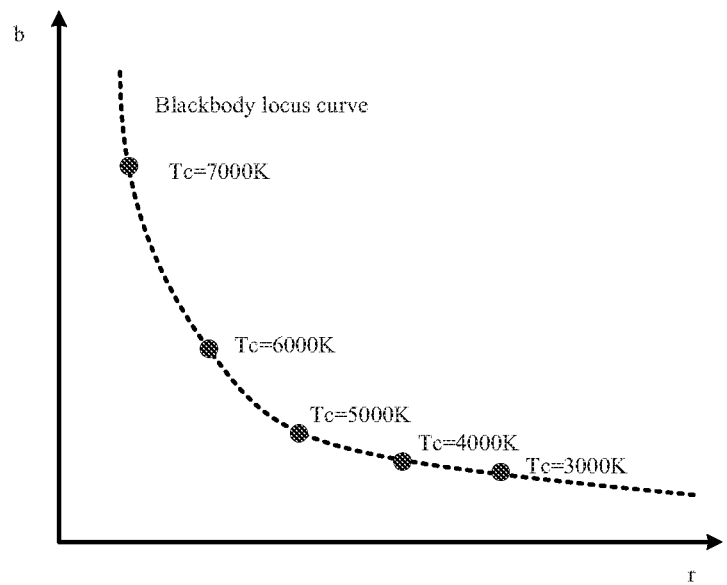
FIGS. 2A-2G are schematic diagrams of a blackbody locus curve according to one example of the present disclosure.

FIG. 2A is a schematic diagram of a blackbody locus curve fitted out. In FIG. 2A, reference may be made by taking an example in which the r value is taken as an abscissa and the b value is taken as an ordinate. One sampling point may be drawn at a coordinate position corresponding to the tricolor information that the r value is 0.6 and the b value is 0.2, wherein the sampling point may represent that Tc=3,000K. One sampling point may be drawn at a coordinate position corresponding to the tricolor information that the r value is 0.5 and the b value is 0.25, wherein the sampling point may represent that Tc=4,000K. One sampling point may be drawn at a coordinate position corresponding to the tricolor information that the r value is 0.4 and the b value is 0.3, wherein the sampling point may represent that Tc=5,000K. One sampling point may be drawn at a coordinate position corresponding to the tricolor information that the r value is 0.3 and the b value is 0.4, wherein the sampling point may represent that Tc=6,000K. One sampling point may be drawn at a coordinate position corresponding to the tricolor information that the r value is 0.2 and the b value is 0.7, wherein the sampling point may represent that Tc=7,000K.

Figure 2B:
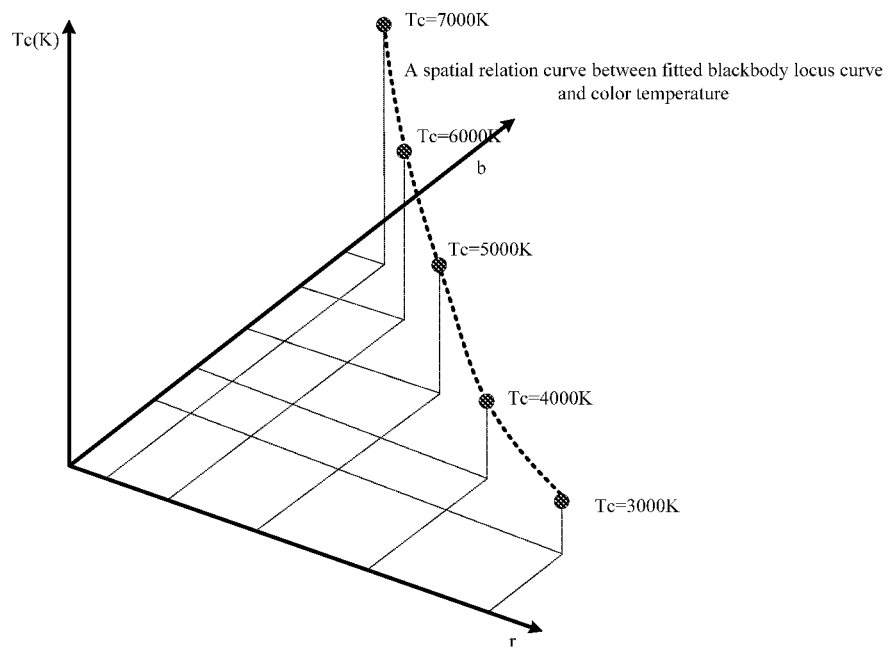

Based on the foregoing treatment, five sampling points may be obtained, and the blackbody locus curve as shown in FIG. 2A may be fitted out by using the five sampling points. Further, the blackbody locus curve as shown in FIG. 2A also may be converted into the blackbody locus curve as shown in FIG. 2B. The blackbody locus curve as shown in FIG. 2A may be a 2-dimensional curve representing a spatial relationship between the r and the b. The blackbody locus curve as shown in FIG. 2B may be a 3-dimensional curve representing a spatial relationship among the r, the b and the Tc. Reference may be made by taking the blackbody locus curve as shown in FIG. 2A as an example in subsequent description.

Treatment 3: M calibration points may be selected from the blackbody locus curve, wherein the M is greater than or equal to the N.

In the examples of the present disclosure, the process of selecting M calibration points from the blackbody locus curve specifically may include but is not limited to following manners. Manner I: each sampling point among the N sampling points may be determined as a calibration point. Manner II: in allusion to any two adjacent sampling points on the blackbody locus curve, it may be determined whether the distance traveled by the two sampling points on the blackbody locus curve is greater than a preset distance; a new sampling point may be interposed between the two sampling points if the determination result is yes so that the distance traveled by any two adjacent sampling points on the blackbody locus curve is not greater than the preset distance after the new sampling point is interposed. All sampling points on the blackbody locus curve may be determined as calibration points. In addition, if it is determined that the distance traveled by the two sampling points on the blackbody locus curve is not greater than the preset distance, no new sampling point may be interposed between the two sampling points, or a new sampling point may be interposed between the two sampling points.

In allusion to Manner I, the five sampling points as shown in FIG. 2A may be directly determined as calibration points.

Figure 2C:
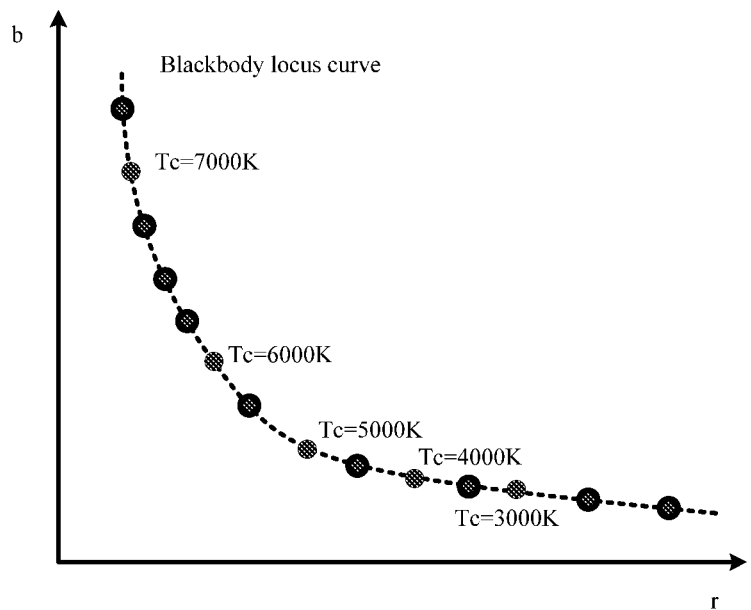

In allusion to Manner II, to the five sampling points as shown in FIG. 2A, supposing the distance traveled by the sampling point representing that Tc=7,000K and the sampling point representing that Tc=6,000K on the blackbody locus curve is greater than the preset distance max_dist, one or more new sampling points may be interposed between the two sampling points. And after the new sampling point(s) is(are) interposed, the distance traveled by any two adjacent sampling points between the sampling point representing that Tc=7,000K and the sampling point representing that Tc=6,000K on the blackbody locus curve may be not greater than the preset distance max_dist. After the foregoing treatment is performed on any two adjacent sampling points as shown in FIG. 2A, a blackbody locus curve as shown in FIG. 2C may be obtained, and the blackbody locus curve totally may include 14 calibration points.

The value of the preset distance max_dist may be arbitrarily set according to practical experiences. The distance between two sampling points may refer to the distance traveled by the two sampling points on the blackbody locus curve. Therefore, the preset distance max_dist also may refer to the distance traveled on the blackbody locus curve.

Treatment 4: for each calibration point, a white sub-region which the calibration point belongs to may be obtained, and a region including white sub-regions for all calibration points may be a white region, namely, the white region for performing automatic white balance obtained at block 101.

After obtaining the M calibration points on the blackbody locus curve, for the first calibration point and the last calibration point on the blackbody locus curve, white sub-regions which the two calibration points belong to may be not obtained. For all other calibration points on the blackbody locus curve, the processes of obtaining a white sub-region which each calibration point belongs to may be the same, and thus reference may be made by taking one calibration point as an example.

In the examples of the present disclosure, the process of obtaining a white sub-region which a calibration point belongs to, specifically may include but is not limited to following manners. First, a first calibration point and a second calibration point adjacent to the calibration point on the blackbody locus curve may be obtained. Then a first midperpendicular corresponding to a first line segment and a second midperpendicular corresponding to a second line segment may be obtained, wherein the first line segment may connect the calibration point with the first calibration point, and the second line segment may connect the calibration point with the second calibration point. Further, a first location point and a second location point may be obtained by taking an intersection point of the first line segment and the first midperpendicular as an initial position and respectively extending by a first preset length from the initial position toward two directions of the first midperpendicular. A third location point and a fourth location point may be obtained by taking an intersection point of the second line segment and the second midperpendicular as an initial position and respectively extending by a second preset length from the initial position toward two directions of the second midperpendicular. Further, a quadrilateral formed by the first location point, the second location point, the third location point and the fourth location point may be determined as a white sub-region which the calibration point belongs to.

The value of the first preset length and the value of the second preset length may be arbitrarily set according to practical experiences, and the first preset length may be identical to or different from the second preset length.

Figure 2D:
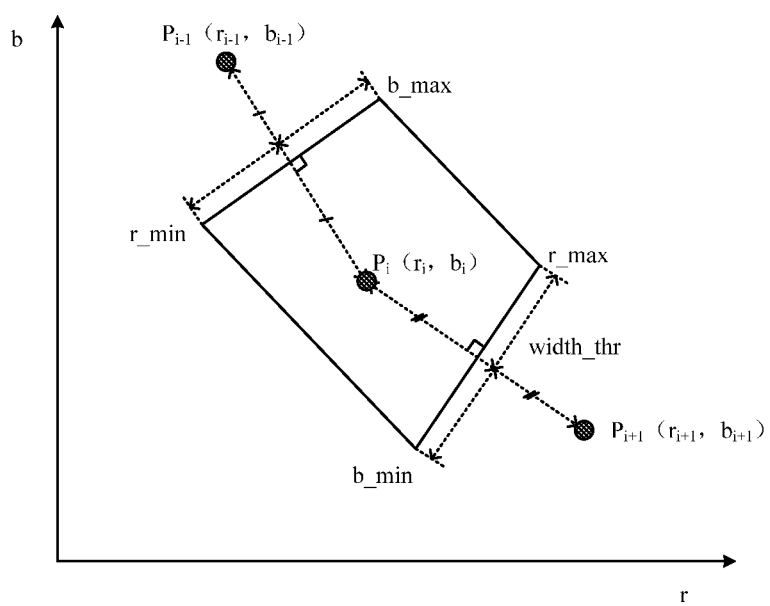

As shown in FIG. 2D, Pi ($r_i$, $b_i$) may denote an $i^{th}$ calibration point for which a white sub-region is to be obtained. Supposing the $r_i$ value is 0.3 and the $b_i$ value is 0.4, the $P_i$ ($r_i$, $b_i$) may be a calibration point representing that Tc=6,000K on the blackbody locus curve. A first calibration point $P_{i-1}(r_{i-1}, b_{i-1})$ and a second calibration point $P_{i+1}(r_{i+1}, b_{i+1})$ adjacent to the calibration point Pi($r_i$, $b_i$) on the blackbody locus curve may be obtained. A first line segment may be obtained by connecting the calibration point Pi($r_i$, $b_i$) with the first calibration point $P_{i-1}(r_{i-1}, b_{i-1})$, and a second line segment may be obtained by connecting the calibration point Pi($r_i$, $b_i$) with the second calibration point $P_{i+1}(r_{i+1}, b_{i+1})$. Further, a first midperpendicular corresponding to the first line segment and a second midperpendicular corresponding to the second line segment may be obtained. A first location point (r_min) and a second location point (b_max) may be obtained by taking an intersection point of the first line segment and the first midperpendicular as an initial position and respectively extending by a first preset length (such as width_thr) from the initial position toward two directions of the first midperpendicular. A third location point (b_min) and a fourth location point (r_max) may be obtained by taking an intersection point of the second line segment and the second midperpendicular as an initial position and respectively extending by the first preset length (such as width_thr) from the initial position toward two directions of the second midperpendicular. The above four location points may form a quadrilateral, which may be a white sub-region corresponding to the calibration point $P_i(r_i, b_i)$.

Figure 2E:
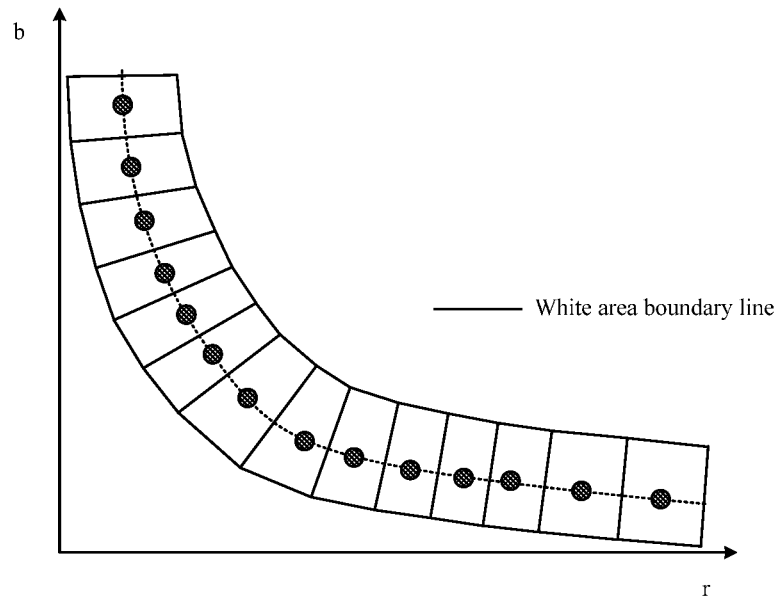

After obtaining a white sub-region corresponding to each calibration point, white sub-regions corresponding to all calibration points may be taken as a white region detected by the front end device. FIG. 2E is a schematic diagram of a white region including a plurality of white sub-regions, namely, the white region including a plurality of white sub-regions may be obtained by using N standard grey scale images having different color temperatures.

At block 1002, for each statistical point of the to-be-detected image, it may be determined whether the statistical point falls within the white region.

After obtaining the white region including a plurality of white sub-regions, for each statistical point of the to-be-detected image, it may be successively determined whether the statistical point falls within the white region. If a statistical point falls within the quadrilateral of a white sub-region, it may be considered that the statistical point falls within the white sub-region, and then it may be determined that the statistical point falls within the white region.

For any statistical point P of the to-be-detected image, the r value and the b value of the statistical point P may be determined, then the statistical point P may be indicated as $P(r_p, b_p)$. The manner for determining the r value and the b value may refer to the above block, which is not repeated any more herein. For the statistical point $P(r_p, b_p)$, all white sub-regions may be traversed successively, and it may be determined whether the statistical point $P(r_p, b_p)$ falls within the currently-traversed white sub-region. No more white sub-region may be traversed if the determination result is yes. If all the white sub-regions are traversed and the statistical point does not fall within any white sub-region, it may be determined that the statistical point $P(r_p, b_p)$ does not fall within the white region.

In the examples of the present disclosure, the process of determining whether a statistical point falls within a white sub-region specifically may include but is not limited to following manners. A first slope and a first intercept of a third line segment connecting the first location point with the second location point may be obtained, and a second slope and a second intercept of a fourth line segment connecting the third location point with the fourth location point may be obtained. Then it may be determined whether the statistical point falls between the third line segment and the fourth line segment by using the first slope, the first intercept, the second slope and the second intercept. A third slope and a third intercept of a fifth line segment connecting the first location point with the third location point may be obtained, and a fourth slope and a fourth intercept of a sixth line segment connecting the second location point with the fourth location point may be obtained. Then it may be determined whether the statistical point falls between the fifth line segment and the sixth line segment by using the third slope, the third intercept, the fourth slope and the fourth intercept. When the statistical point falls between the third line segment and the fourth line segment and between the fifth line segment and the sixth line segment, it may be determined that the statistical point falls within the white sub-region enclosed by the four location points. Otherwise, it may be determined that the statistical point does not fall within the white sub-region enclosed by the four location points. The above is merely one feasible manner for determining whether a statistical point falls within a white sub-region, and in practical application, it may be determined whether a statistical point falls within a white sub-region by other means, which is not repeated any more herein.

Figure 2F:
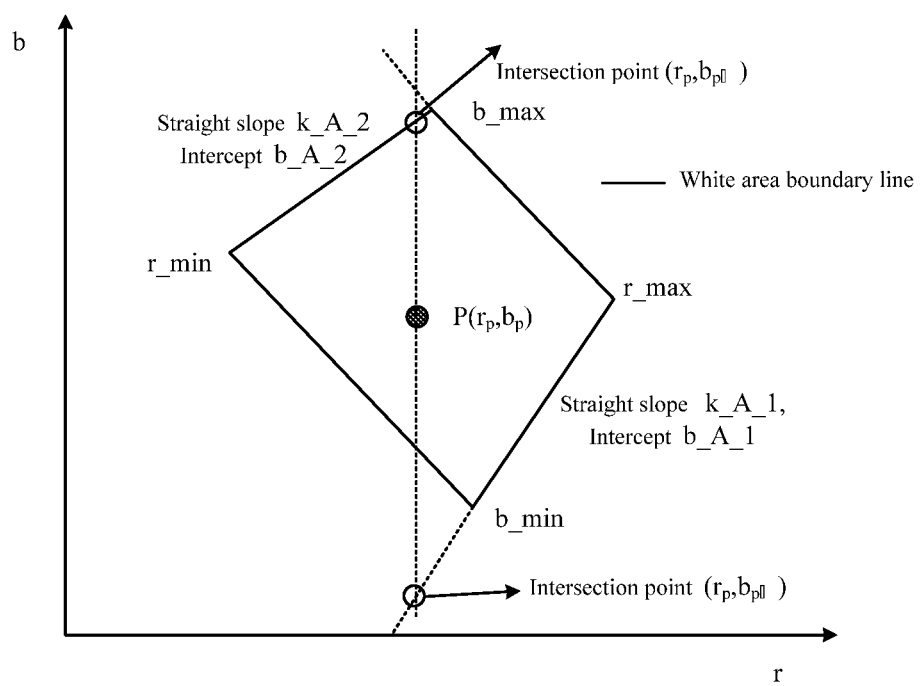

As shown in FIG. 2F, it is assumed to determine whether the statistical point $P(r_p, b_p)$ falls within the white sub-region corresponding to the calibration point $P_i(r_i, b_i)$. After obtaining the third line segment connecting the first location point (r_min) with the second location point (b_max), the first slope (k_A_2) and the first intercept (b_A_2) of the third line segment may also be obtained. After obtaining the fourth line segment connecting the third location point (b_min) with the fourth location point (r_max), the second slope (k_A_1) and the second intercept (b_A_1) of the fourth line segment may also be obtained. After obtaining the fifth line segment connecting the first location point (r_min) with the third location point (b_min), the third slope (k_B_2) and the third intercept (b_B_2) of the fifth line segment may also be obtained. After obtaining the sixth line segment connecting the second location point (b_max) with the fourth location point (r_max), the fourth slope (k_B_1) and the fourth intercept (b_B_1) of the sixth line segment may also be obtained. After obtaining the white sub-region corresponding to the calibration point Pi($r_i$, $b_i$), the first slope (k_A_2) and the first intercept (b_A_2), the second slope (k_A_1) and the second intercept (b_A_1), the third slope (k_B_2) and the third intercept (b_B_2), and the fourth slope (k_B_1) and the fourth intercept (b_B_1) may be stored on the front end device, and the stored information may be directly used in a subsequent process.

Based on this, after determining the third line segment, the fourth line segment, the fifth line segment and the sixth line segment, the first slope (k_A_2) and the first intercept (b_A_2), the second slope (k_A_1) and the second intercept (b_A_1), the third slope (k_B_2) and the third intercept (b_B_2), and the fourth slope (k_B_1) and the fourth intercept (b_B_1) may be calculated out, and the calculation may use many ways and is not described herein.

The process of determining whether the statistical point P($r_p$, $b_p$) falls between the third line segment and the fourth line segment by using the first slope (k_A_2), the first intercept (b_A_2), the second slope (k_A_1) and the second intercept (b_A_1) may be as below. It may be calculated that $b_{p'}=r_p*$k_A_2+b_A_2, and it may be calculated that $b_{p''}=r_p*$k_A_1+b_A_1. If the $b_p$ is less than the $b_{p'}$ and the $b_p$ is greater than the $b_{p''}$, or the $b_p$ is greater than the $b_{p'}$, and the $b_p$ is less than the $b_{p''}$, it may be determined that the statistical point P($r_p$, $b_p$) falls between the third line segment and the fourth line segment. Otherwise, it may be determined that the statistical point P($r_p$, $b_p$) does not fall between the third line segment and the fourth line segment.

The process of determining whether the statistical point P($r_p$, $b_p$) falls between the fifth line segment and the sixth line segment by using the third slope (k_B_2), the third intercept (b_B_2), the fourth slope (k_B_1) and the fourth intercept (b_B_1) may be as below. It may be calculated that $b_{p'}=r_p*$k_B_2+b_B_2, and it may be calculated that $b_{p''}=r_p*$k_B_1+b_B_1. If the $b_p$ is less than the $b_{p'}$ and the $b_p$ is greater than the $b_{p''}$, or the $b_p$ is greater than the $b_{p'}$, and the $b_p$ is less than the $b_{p''}$, it may be determined that the statistical point P($r_p$, $b_p$) falls between the fifth line segment and the sixth line segment. Otherwise, it may be determined that the statistical point P($r_p$, $b_p$) does not fall between the fifth line segment and the sixth line segment.

A slope-intercept equation y=k*x+b may be employed to determine whether the statistical point P($r_p$, $b_p$) falls between the third line segment and the fourth line segment or falls between the fifth line segment and the sixth line segment in the above. And wherein the used first intercept (b_A_2), the second intercept (b_A_1), the third intercept (b_B_2) and the fourth intercept (b_B_1) may be vertical intercepts. In practical application, if other equations are employed to determine whether the statistical point P($r_p$, $b_p$) falls between the third line segment and the fourth line segment or falls between the fifth line segment and the sixth line segment, the used first intercept (b_A_2), the second intercept (b_A_1), the third intercept (b_B_2) and the fourth intercept (b_B_1) may be vertical intercepts and/or horizontal intercepts. In this application scenario, other available equations may be not described in detail.

In the examples of the present disclosure, before determining whether a statistical point falls within any white sub-region, a circumscribed quadrilateral of the white sub-region may be formed by two horizontal straight lines and two perpendicular straight lines. The circumscribed quadrilateral may be a rectangle, and the white sub-region may locate within the circumscribed quadrilateral. The two horizontal straight lines may be straight lines parallel to an X-axis of a coordinate system for the white sub-region, and the two perpendicular straight lines may be straight lines perpendicular to the X-axis of the coordinate system for the white sub-region. When the statistical point falls between the two horizontal straight lines and between the two perpendicular straight lines, the process of determining whether the statistical point falls within the white sub-region may be executed. When the statistical point does not fall between the two horizontal straight lines and/or does not fall between the two perpendicular straight lines, it may be directly determined that the statistical point does not fall within the white sub-region.

Figure 2G:
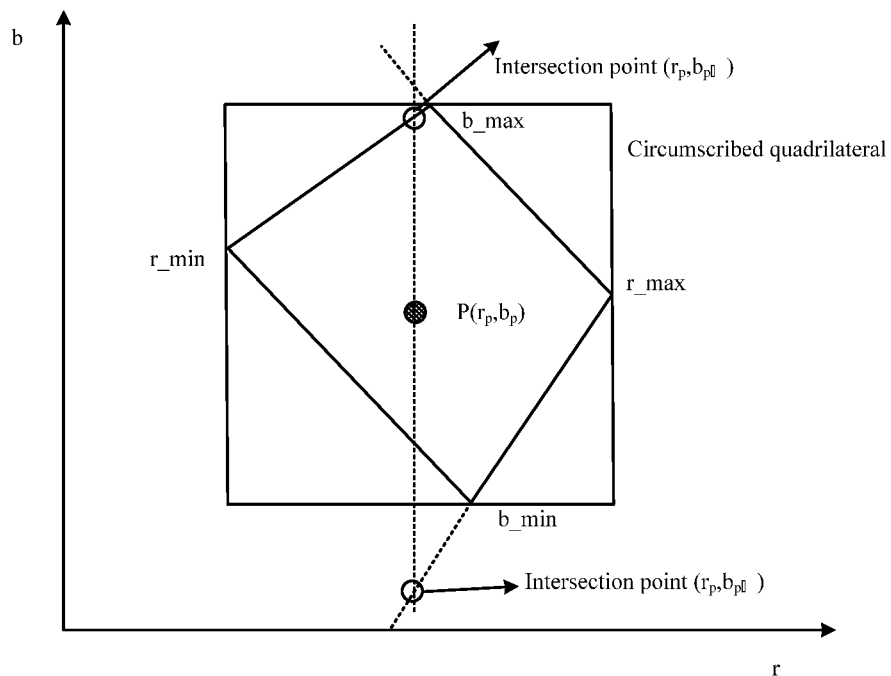

FIG. 2G is a schematic diagram of the circumscribed quadrilateral of the white sub-region. When determining whether the statistical point P($r_p$, $b_p$) falls between the two horizontal straight lines, it may be enough to compare the ordinate value $b_p$ of the statistical point with the ordinate values of the two horizontal straight lines. When determining whether the statistical point P($r_p$, $b_p$) falls between the two perpendicular straight lines, it may be enough to compare the abscissa value $r_p$ of the statistical point with the abscissa values of the two perpendicular straight lines. Based on the above manner, it may be preliminarily determined whether the statistical point P($r_p$, $b_p$) falls within the circumscribed quadrilateral of the white sub-region by way of comparison. If the statistical point P($r_p$, $b_p$) does not fall within the circumscribed quadrilateral of the white sub-region, it may be determined that the statistical point P($r_p$, $b_p$) does not fall within the white sub-region. If the statistical point P($r_p$, $b_p$) falls within the circumscribed quadrilateral of the white sub-region, it may be continued to determine whether the statistical point P($r_p$, $b_p$) falls within the white sub-region. Based on the above manner, it may be first determined whether the statistical point P($r_p$, $b_p$) falls within the circumscribed quadrilateral of the white sub-region, and unless the statistical point P($r_p$, $b_p$) falls within the circumscribed quadrilateral of the white sub-region, it may not be determined whether the statistical point P($r_p$, $b_p$) falls within the white sub-region. Thus, an amount of calculation may be effectively reduced, multiple multiplications may be avoided, a multiplication invocation probability may be effectively reduced, and an operational speed may be improved.

Based on the above process, all statistical points falling within the white region may be determined. However, in the examples of the present disclosure, a statistical point falling within the white region may be not directly determined as a white point, instead, all the statistical points falling within the white region may be analyzed in subsequent blocks, and interfering points thereamong may be determined as non-white points.

At block 1003, one or more clusters may be generated by clustering all statistical points falling within the white region.

All statistical points as mentioned in subsequent processes of the example may refer to the statistical points within the white region.

Figure 3A:
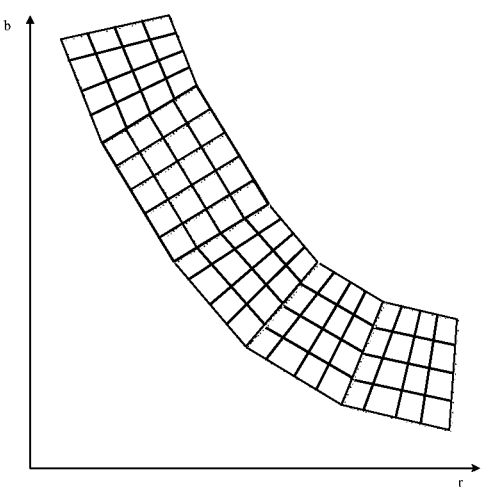
FIGS. 3A-3C are schematic diagrams illustrating clustering of statistical points according to one example of the present disclosure.

In an example of the present disclosure, each white sub-region may be equally divided into a plurality of sub-regions according to a principle of equal division, wherein each sub-region may be a polygon, and reference may be made by taking an example in which each sub-region is a quadrilateral, as shown in FIG. 3A. Based on this, the sub-region which the statistical point belongs to may be determined, and a specific determination manner may be similar to the manner for determining the white sub-region which the statistical point belongs to.

For example, for any statistical point $P(r_p, b_p)$ of the to-be-detected image, each sub-region among all white sub-regions may be traversed successively, and it may be determined whether the statistical point $P(r_p, b_p)$ falls within the quadrilateral of the currently-traversed sub-region. If the determination result is yes, no more sub-region may be traversed, and it may be determined that the statistical point $P(r_p, b_p)$ falls within the currently-traversed sub-region.

Further, it may be determined whether a statistical point $P(r_p, b_p)$ falls within a sub-region based on four slopes and four intercepts respectively corresponding to four sides of a quadrilateral of the sub-region, and a specific determination manner may refer to the foregoing manner for determining whether the statistical point falls within the white sub-region, which is not repeated any more herein.

In an example of the present disclosure, the process of generating one or more clusters by clustering all statistical points within the white regions specifically may include but is not limited to the following manners. The number of statistical points within each sub-region may be determined. According to a density-based spatial clustering algorithm which takes a center of each sub-region as a clustering object and the number of statistical points within the sub-region as a density of the clustering object, one or more clusters may be generated from the sub-regions. For each statistical point within the white region, a sub-region to which the statistical point belongs may be determined, a cluster to which the sub-region belongs may be determined, and the statistical point may be classified into the cluster.

Figure 3B:
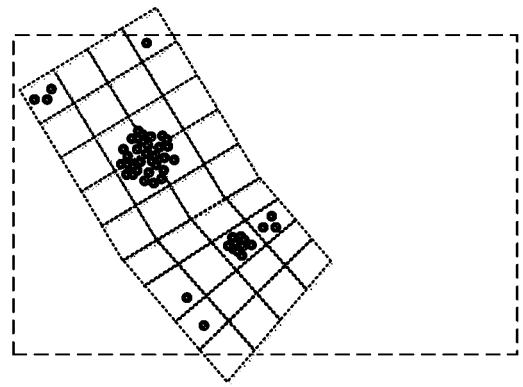
Figure 3C:
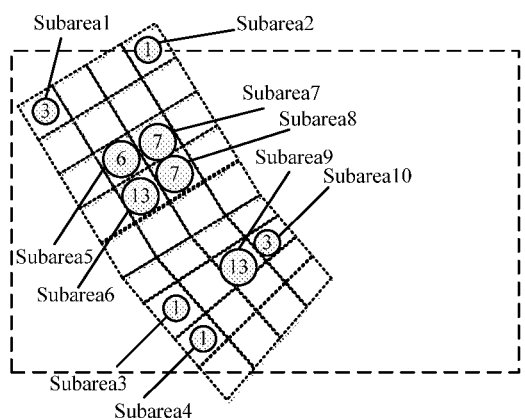

In the process of determining the number of statistical points within each sub-region, when it is determined that a statistical point $P(r_p, b_p)$ falls within a certain sub-region, the number of statistical points within this sub-region may be increased by one. In this way, when sub-regions are determined for all statistical points $P(r_p, b_p)$, the number of statistical points within each sub-region may be determined. FIG. 3B is a schematic diagram of sub-regions determined for all statistical points, and FIG. 3C is a schematic diagram illustrating the number of statistical points within each sub-region determined in FIG. 3B.

Regarding the spatial clustering, many algorithms have been proposed. Spatial clustering algorithms may include a partition-based clustering algorithm, a hierarchical-based clustering algorithm, a density-based clustering algorithm, a grid-based clustering algorithm, and a model-based clustering algorithm, etc. In the examples of the present disclosure, all statistical points falling within the white region may be clustered by using the density-based spatial clustering algorithm, and one or more clusters may be obtained. The density-based spatial clustering algorithm is mainly characterized by using a region density as a basis for partitional clustering, and adding a data space region into a similar cluster as long as the density of the data space region exceeds a predefined threshold. The density-based spatial clustering algorithm may be a Density-based Spatial Clustering of Applications with Noise (DBSCAN) algorithm, an Ordering Points To Identify the Clustering Structure (OPTICS) algorithm, and a Density-based Clustering (DENCLUE) algorithm, etc.

According to the density-based spatial clustering algorithm which takes a center of each sub-region as a clustering object and the number of statistical points within the sub-region as a density of the clustering object, one or more clusters may be generated from the sub-regions. As shown in FIG. 3C, since the number of statistical points within each of a sub-region 5, a sub-region 6, a sub-region 7, a sub-region 8, a sub-region 9 and a sub-region 10 is more, or the number of statistical points of their adjacent sub-regions is more, the sub-region 5, the sub-region 6, the sub-region 7 and the sub-region 8 which are adjacent may be taken as a cluster 1, and the sub-region 9 and the sub-region 10 which are adjacent may be taken as a cluster 2. Further, the sub-region 1 may form a cluster 3, the sub-region 2 may form a cluster 4, and the sub-region 3 and the sub-region 4 may form a cluster 5.

Since the number of statistical points may likely be more or less, when performing a clustering analysis for each statistical point, the computational complexity may be high. However, the number of sub-regions may be under control. Therefore, in the example, a clustering analysis may be carried out for each sub-region instead of each statistical point, which may reduce a computational complexity. For example, if there are 1,024 statistical points and 256 sub-regions and a time complexity in clustering analysis is $O(N^2)$, when performing a clustering analysis for each statistical point, the time complexity may be $O(1024^2)$, and when performing a clustering analysis for each sub-region, the time complexity may be $O(256^2)$. Apparently, the computational complexity may be reduced if a clustering analysis is performed for each sub-region.

At block 1004, when the number of statistical points within the cluster is greater than a preset threshold, the cluster may be determined as a target cluster and the statistical points falling within the target cluster may be determined as white points. When the number of statistical points within the cluster is not greater than the preset threshold, the statistical points falling within the target cluster may be determined as non-white points (interfering points).

As shown in FIG. 3C, for the cluster 1 and the cluster 2 within the white region, if the number of statistical points within the cluster 1 is greater than a preset threshold, the cluster 1 may be determined as a target cluster and all the statistical points within the target cluster may be determined as white points. If the number of statistical points within the cluster 2 is greater than the preset threshold, the cluster 2 may be determined as a target cluster and all the statistical points within the target cluster may be determined as white points. In addition, for the cluster 3, the cluster 4 and the cluster 5, if the number of statistical points within the cluster 3 is not greater than the preset threshold, all the statistical points within the cluster 3 may be determined as non-white points; if the number of statistical points within the cluster 4 is not greater than the preset threshold, all the statistical points within the cluster 4 may be determined as non-white points; if the number of statistical points within the cluster 5 is not greater than the preset threshold, all the statistical points within the cluster 5 may be determined as non-white points.

The preset threshold may be arbitrarily set according to practical experiences, for example, may be set as 5.

Based on the foregoing manner, by clustering statistical points falling within the white region, interfering points may be effectively separated from white points and the interfering points may be determined as non-white points. In this way, the interfering points falling within the white region may be eliminated.

At block 1005, a white balance gain of the to-be-detected image may be calculated based on the target cluster. Afterwards, the to-be-detected image may be corrected by using the white balance gain, wherein a specific correction process is not unnecessarily described any more.

After the process of block 1004, interfering points may be effectively separated from white points, and interfering points falling within the white region may be eliminated, namely, clusters including interfering points also may be eliminated.

In an example of the present disclosure, the process of calculating the white balance gain of the to-be-detected image based on the target cluster specifically may include but is not limited to following manners. A clustering feature of the target cluster and tricolor information of statistical points falling within the target cluster may be obtained, and a weight value may be allocated for a statistical point falling within the target cluster by using the clustering feature of the target cluster. Further, the white balance gain of the to-be-detected image may be calculated by using the weight values and the tricolor information of the statistical points falling within the target cluster.

In an example of the present disclosure, the process of allocating a weight value for a statistical point falling within the target cluster by using the clustering feature of the target cluster specifically may include but is not limited to following manners. Manner I: when the clustering feature indicates there is only one target cluster within the white region, an identical weight value may be allocated for each statistical point within the target cluster. Manner II: when the clustering feature indicates there are at least two target clusters within the white region, weight values may be allocated for the statistical points within the target clusters by using a weighting parameter, such that the statistical points within the same target cluster may have the same weight value and the statistical points within different target clusters may have different weight values. The weighting parameter specifically may include but is not limited to one or more of followings: the number of statistical points within a cluster, a color temperature corresponding to a center position of the cluster, and a distance relation between the center position of the cluster and a blackbody locus curve.

In allusion to Manner I, when there is only one target cluster in the white region, this indicates that all white points may fall within the target cluster, interfering points have been eliminated, and an identical weight value may be allocated for each statistical point (namely, white point) within the target cluster.

In allusion to Manner II, when there are at least two target clusters in the white region, this indicates that all white points may fall within the at least two target clusters, interfering points have been eliminated, and weight values may be allocated for statistical points within the target clusters, such that the statistical points within the same target cluster may have the same weight value and the statistical points within different target clusters may have different weight values. As shown in FIG. 3C, the same weight value a may be allocated for all the statistical points within the cluster 1, and the same weight value b may be allocated for all the statistical points within the cluster 2.

In an example of the present disclosure, a different weight value may be allocated for statistical points within each target cluster according to a weighting parameter. For example, the larger the number of statistical points within a target cluster is, the larger the weight value allocated for the statistical points within the target cluster is. The closer the color temperature corresponding to the center position of the target cluster is to a common color temperature section of a light source, the larger the weight value allocated for the statistical points within the target cluster is. The nearer the distance between the center position of the target cluster and the blackbody locus curve is, the larger the weight value allocated for the statistical points within the target cluster is.

The closer the color temperature being to a common color temperature section of a light source may be understood that: if the color temperature of a light source used by a calibrated white balance is from 2,000K to 10,000K whereas in practice the common color temperature of the light source is from 4,000K to 6,000K, it may be indicated that the color temperature gets close to the common color temperature section of the light source when the color temperature is within a section from 4,000K to 6,000K.

For example, if the number of statistical points within the cluster 1 is greater than that of statistical points within the cluster 2, the weight value a allocated for all the statistical points within the cluster 1 may be greater than the weight value b allocated for all the statistical points within the cluster 2. Alternatively, if the color temperature corresponding to the center position of the cluster 1 is closer to a common color temperature section of a light source than that corresponding to the center position of the cluster 2, the weight value a allocated for all the statistical points within the cluster 1 may be greater than the weight value b allocated for all the statistical points within the cluster 2. Alternatively, if the distance between the center position of the cluster 1 and the blackbody locus curve is closer than the distance between the center position of the cluster 2 and the blackbody locus curve, the weight value a allocated for all the statistical points within the cluster 1 may be greater than the weight value b allocated for all the statistical points within the cluster 2.

By taking an example in which the weighting parameter corresponding to a cluster may simultaneously include the number of statistical points within the cluster, the color temperature corresponding to the center position of the cluster, and the distance relation between the center position of the cluster and the blackbody locus curve, one feasible implementation may be as below. Suppose the number of the statistical points within the cluster 1 is numA, the number of the statistical points within the cluster 2 is numB, a difference value between the color temperature corresponding to the center position of the cluster 1 and a mid-value of the common color temperature section of the light source is T1, a difference value between the color temperature corresponding to the center position of the cluster 2 and the mid-value of the common color temperature section of the light source is T2, the distance between the center position of the cluster 1 and the blackbody locus curve is D1, and the distance between the center position of the cluster 2 and the blackbody locus curve is D2. Then the weight value a and the weight value b may be determined according to the following two equations:

$$\text{the weight value } a = \text{Coefficient } 1 * numA/(numA + numB) + \text{Coefficient } 2 * [1 - T1/(T1+T2)] + \text{Coefficient } 3 * [1 - D1/(D1+D2)];$$

$$\text{the weight value } b = \text{Coefficient } 1 * numB/(numA + numB) + \text{Coefficient } 2 * [1 - T2/(T1+T2)] + \text{Coefficient } 3 * [1 - D2/(D1+D2)].$$

The Coefficient 1, the Coefficient 2 and the Coefficient 3 may be numerical values configured according to practical experiences.

Of course, in practical application, other clustering features may also be available, and other manners for allocating weight values also may be adopted, which are not repeated any more herein.

In an example of the present disclosure, the tricolor information of a statistical point specifically may include: a response value of Component G, a response value of Component R and a response value of Component B of the statistical point. Based on this, the process of calculating the white balance gain of the to-be-detected image by using the weight values and the tricolor information of statistical points within the target cluster specifically may include but is not limited to:

calculating an R channel gain CrAvg of the to-be-detected image by using a following formula:

$$CrAvg = \frac{\sum Cr(i) \times W(i)}{\sum W(i)},$$

calculating a B channel gain CbAvg of the to-be-detected image by using a following formula:

$$CbAvg = \frac{\sum Cb(i) \times W(i)}{\sum W(i)},$$

and assigning a numerical value to a G channel gain CgAvg of the to-be-detected image; wherein i denotes an $i^{th}$ statistical point within a cluster, the i has a value range from 1 to N, and the N is a maximum number of statistical points. W(i) denotes the weight value of the $i^{th}$ statistical point within the cluster. Cr(i) denotes a value obtained by dividing the response value of Component G of the $i^{th}$ statistical point within the cluster by the response value of Component R of the $i^{th}$ statistical point, namely, Cr=G/R. Cb(i) denotes a value obtained by dividing the response value of Component G of the $i^{th}$ statistical point within the cluster by the response value of Component B of the $i^{th}$ statistical point, namely, Cb=G/B. The assigned value generally may be 1.0.

Based on the foregoing technical solution, in the examples of the present disclosure, by clustering statistical points falling within the white region, interfering points (white points under a weak light source at different color temperatures, white points with larger color temperature difference or other colorized points) may be effectively separated from white points and the interfering points may be determined as non-white points. In this way, the interfering points falling within the white region may be eliminated. When calculating the white balance gain, an adverse effect of the interfering points on the white balance may be eliminated, and an adverse effect of local colorized sceneries and multisource light supplement, moving objects, and mixed color temperatures or the like on the white balance may be eliminated so that the automatic white balance may be applicable to complex scenes where the local colorized sceneries and the multisource light supplement are present, and moving colorized objects and mixed color temperatures or the like are present. In this way, a precision and stability in automatic white balance processing in complex scenes may be improved.

Figure 4:
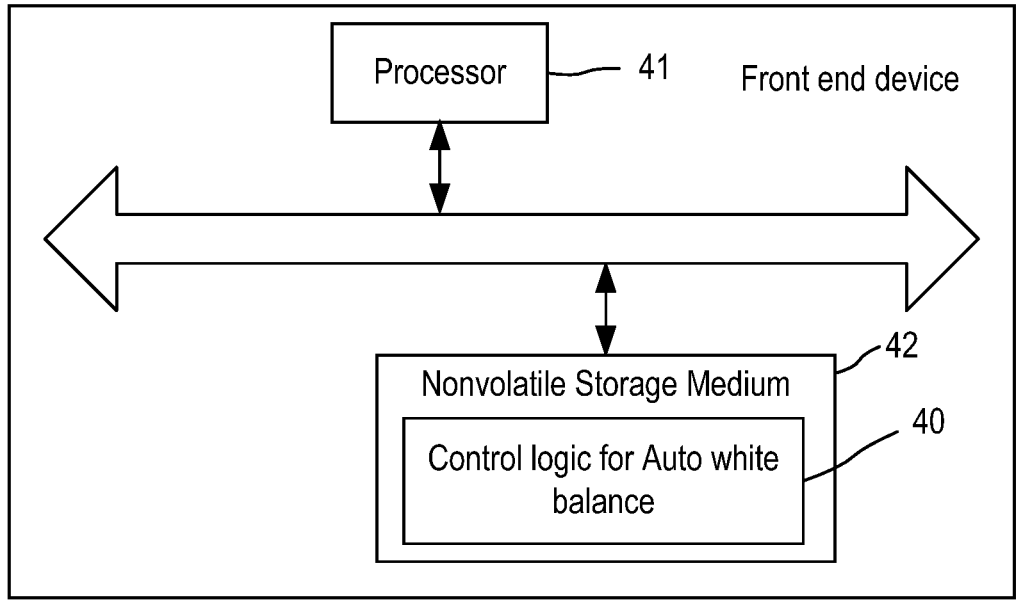
FIG. 4 is a hardware structure diagram of a front end device according to one example of the present disclosure.

Based on the same inventive concept as the foregoing method, examples of the present disclosure provide an apparatus for automatic white balance, which may be applied to a front end device. The apparatus for automatic white balance may be implemented by means of software, or may be implemented by means of hardware or a combination of software and hardware. Taking software implementation as an example, as an apparatus in a logical sense, it is formed by reading machine-executable instructions in a nonvolatile storage medium by a processor of the front end device. As shown in FIG. 4, it is a hardware structure diagram of a front end device located with the apparatus for automatic white balance. In addition to a processor 41 and a nonvolatile storage medium 42 storing a control logic for automatic white balance 40, the front end device may further include other hardwares, such as a forwarding chip in charge of packet processing, a network interface, a memory, and so on. From a perspective of a hardware structure, the front end device may also be a distributed device, and may include a plurality of interface cards so as to carry out extension of packet processing.

Figure 5:
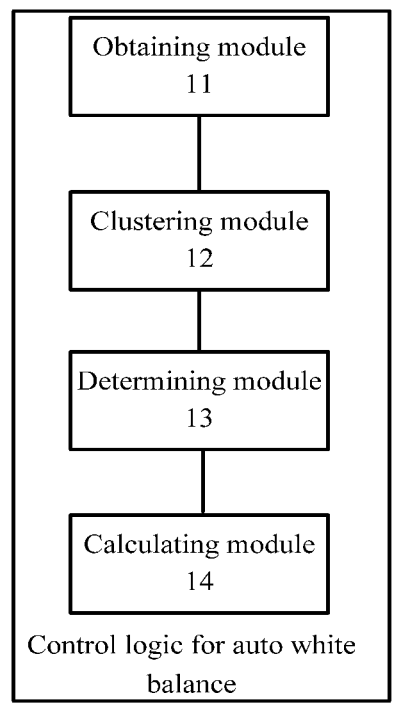
FIG. 5 is a block diagram of functional modules of a control logic for automatic white balance according to one example of the present disclosure.

FIG. 5 illustrates a block diagram of functional modules of the control logic for automatic white balance according to the present disclosure, and the functional modules of the control logic for automatic white balance may specifically include:

an obtaining module 11, configured to obtain a white region used for performing automatic white balance;

a clustering module 12, configured to generate at least one cluster by clustering statistical points within the white region of a to-be-detected image;

a determining module 13, configured to determine, in case that the number of statistical points within one cluster is greater than a preset threshold, the cluster as a target cluster and determine the statistical points falling within the target cluster as white points; and a calculating module 14, configured to calculate a white balance gain of the to-be-detected image based on the target cluster.

The white region may include a plurality of sub-regions. The clustering module 12 may determine the number of statistical points within each sub-region when clustering the statistical points of the to-be-detected image falling within the white region. The clustering module 12 may cluster the plurality of sub-regions to generate at least one cluster by using a density-based spatial clustering algorithm which takes a center of the sub-region as a clustering object and the number of statistical points within the sub-region as a density of the clustering object.

In a process of calculating a white balance gain of the to-be-detected image based on the target cluster, the calculating module 14 may obtain a clustering feature of the target cluster and tricolor information of statistical points falling within the target cluster, allocate a weight value for the statistical points falling within the target cluster by using the clustering feature, and calculate the white balance gain of the to-be-detected image by using the weight value and the tricolor information of the statistical points falling within the target cluster.

In the process of allocating a weight value for the statistical points falling within the target cluster by using the clustering feature, the calculating module 14 may allocate an identical weight value for the statistical points within the target cluster when the clustering feature indicates there is only one target cluster in the white region, or allocate weight values for the statistical points within the target clusters by using a weighting parameter when the clustering feature indicates there are at least two target clusters in the white region, such that the statistical points within the same target cluster may have the same weight value, and the statistical points within different target clusters may have different weight values. The weighting parameter includes one or more of followings: the number of statistical points within a cluster, a color temperature corresponding to a center position of the cluster, and a distance relation between the center position of the cluster and a blackbody locus curve.

In case that there are more of the statistical points within the target cluster, a larger weight value may be allocated for the statistical points within the target cluster. In case that the color temperature corresponding to the center position of the target cluster becomes closer to a common color temperature section of a light source, a larger weight value may be allocated for the statistical points within the target cluster. In case that the center position of the target cluster becomes nearer to the blackbody locus curve, a larger weight value may be allocated for the statistical points within the target cluster.

The tricolor information of the statistical points may include: a response value of Component G, a response value of Component R and a response value of Component B of the statistical points. In the process of calculating the white balance gain of the to-be-detected image by using the weight value and the tricolor information of the statistical points falling within the target cluster, the calculating module 14 may calculate an R channel gain CrAvg of the to-be-detected image by using a following formula:

$$CrAvg = \frac{\sum Cr(i) \times W(i)}{\sum W(i)},$$

calculate a B channel gain CbAvg of the to-be-detected image by using a following formula:

$$CbAvg = \frac{\sum Cb(i) \times W(i)}{\sum W(i)},$$

and assign a numerical value to a G channel gain CgAvg of the to-be-detected image; wherein i may denote an $i^{th}$ statistical point within a cluster, W(i) may denote the weight value of the $i^{th}$ statistical point, Cr(i) may denote a value obtained by dividing the response value of Component G of the $i^{th}$ statistical point by the response value of Component R of the $i^{th}$ statistical point, and Cb(i) may denote a value obtained by dividing the response value of Component G of the $i^{th}$ statistical point by the response value of Component B of the $i^{th}$ statistical point.

Various modules of the apparatus in the present disclosure may be integrated as a whole, or may be detachably deployed. The foregoing modules may be merged into one module, or may be further divided into a plurality of submodules.

Those skilled in the art may understand that modules in the apparatus in the example may be distributed according to description of the example, or may be correspondingly changed and positioned in one or more apparatuses different from this example. The foregoing modules in the example may be merged into one module, or may be further divided into a plurality of submodules. Serial numbers in the foregoing examples of the present disclosure are merely for the purpose of descriptions and do not represent advantages and disadvantages of the examples.

Disclosed above are merely several specific examples of present disclosure, but the present disclosure is not limited to this, any change conceivable to those skilled in the art may fall within the scope of protection of the present disclosure.

The invention claimed is:

1. A method for correcting an image, comprising:
obtaining, by a front end device of a video monitoring system, a white region for performing automatic white balance;
generating, by the front end device, at least one cluster by clustering statistical points within the white region of a to-be-detected image which is captured by the video monitoring system;
in case that a number of statistical points within one of said clusters is greater than a preset threshold,
determining, by the front end device, the cluster as a target cluster;
determining, by the front end device, statistical points within the target cluster as white points;
determining, by the front end device, a white balance gain of the to-be-detected image based on the target cluster; and
correcting, by the front end device, the to-be-detected image based on the determined white balance gain; and
wherein the white region comprises a plurality of sub-regions, and clustering the statistical points within the white region of the to-be-detected image comprises:
determining, by the front end device, a number of statistical points within each of the sub-regions; and
generating, by the front end device, at least one cluster from the plurality of sub-regions according to a density-based spatial clustering algorithm which takes a center of each of the sub-regions as a clustering object and takes the number of statistical points within each of the sub-regions as a density of the clustering object.

2. The method according to claim 1, wherein determining the white balance gain of the to-be-detected image based on the target cluster comprises:
obtaining, by the front end device, a clustering feature of the target cluster and tricolor information of statistical points within the target cluster;
allocating, by the front end device, a weight value for the statistical points within the target cluster according to the clustering feature; and
determining, by the front end device, the white balance gain of the to-be-detected image with the weight value and the tricolor information of the statistical points within the target cluster.

3. The method according to claim 2, wherein the tricolor information of a statistical point comprises a response value of Component G, a response value of Component R, and a response value of Component B of the statistical point.

4. The method according to claim 3, wherein determining the white balance gain of the to-be-detected image with the weight value and the tricolor information of the statistical points within the target cluster comprises:
determining, by the front end device, an R channel gain CrAvg of the to-be-detected image according to a following formula:

$$CrAvg = \frac{\sum Cr(i) \times W(i)}{\sum W(i)};$$

determining, by the front end device, a B channel gain CbAvg of the to-be-detected image according to a following formula:

$$CbAvg = \frac{\sum Cb(i) \times W(i)}{\sum W(i)};$$

assigning, by the front end device, a numerical value to a G channel gain CgAvg of the to-be-detected image; wherein i denotes an $i^{th}$ statistical point within a cluster, W(i) denotes the weight value of the $i^{th}$ statistical point, Cr(i) denotes a value obtained by dividing the response value of Component G of the $i^{th}$ statistical point by the response value of Component R of the $i^{th}$ statistical point, and Cb(i) denotes a value obtained by dividing the response value of Component G of the $i^{th}$ statistical point by the response value of Component B of the $i^{th}$ statistical point.

5. The method according to claim 2, wherein allocating the weight value for the statistical points within the target cluster according to the clustering feature comprises:

in case that the clustering feature indicates there is only one target cluster within the white region, allocating, by the front end device, an identical weight value for the statistical points within the target cluster; and in case that the clustering feature indicates there are at least two target clusters within the white region, allocating, by the front end device, weight values for the statistical points within the target clusters according to a weighting parameter such that the statistical points within the same target cluster have the same weight value and the statistical points within different target clusters have different weight values.

6. The method according to claim 5, wherein the weighting parameter comprises one or more of the following:

the number of statistical points within a cluster;

a color temperature corresponding to a center position of the cluster; and a distance relation between the center position of the cluster and a blackbody locus curve.

7. The method according to claim 6, wherein allocating weight values for the statistical points within the target clusters according to the weighting parameter comprises:

allocating, by the front end device, a larger weight value for the statistical points within a target cluster as there are more statistical points in the target cluster;

allocating, by the front end device, a larger weight value for the statistical points within a target cluster as the color temperature corresponding to the center position of the target cluster becomes closer to a common color temperature section of a light source; and allocating, by the front end device, a larger weight value for the statistical points within a target cluster as the center position of the target cluster becomes nearer to the blackbody locus curve.

8. An apparatus for correcting an image, comprising a processor and a non-transitory storage medium storing machine-executable instructions corresponding to a control logic for automatic white balance, wherein by executing the machine-executable instructions the processor is caused to:

obtain a white region for performing automatic white balance;

generate at least one cluster by clustering statistical points within the white region of a to-be-detected image which is captured by a video monitoring system;

in case that a number of statistical points within one of said clusters is greater than a preset threshold:

determine the cluster as a target cluster;

determine the statistical points within the target cluster as white points;

determine a white balance gain of the to-be-detected image based on the target cluster; and correct the to-be-detected image based on the determined white balance gain; and wherein the white region comprises a plurality of sub-regions, and when clustering the statistical points within the white region of the to-be-detected image, the machine-executable instructions further cause the processor to:

determine a number of statistical points within each of the sub-regions; and generate at least one cluster from the plurality of sub-regions according to a density-based spatial clustering algorithm which takes a center of each of the sub-regions as a clustering object and takes the number of statistical points within each of the sub-regions as a density of the clustering object.

9. The apparatus according to claim 8, wherein when determining the white balance gain of the to-be-detected image based on the target cluster, the machine-executable instructions further cause the processor to:

obtain a clustering feature of the target cluster and tricolor information of statistical points within the target cluster;

allocate a weight value for the statistical points within the target cluster according to the clustering feature; and determine the white balance gain of the to-be-detected image with the weight value and the tricolor information of the statistical points within the target cluster.

10. The apparatus according to claim 9, wherein the tricolor information of the statistical points comprises: a response value of Component G, a response value of Component R, and a response value of Component B of the statistical points;

when determining the white balance gain of the to-be-detected image with the weight value and the tricolor information of the statistical points within the target cluster, the machine-executable instructions further cause the processor to:

determine an R channel gain CrAvg of the to-be-detected image according to a following formula:

$$CrAvg = \frac{\sum Cr(i) \times W(i)}{\sum W(i)};$$

determine a B channel gain CbAvg of the to-be-detected image according to a following formula:

$$CbAvg = \frac{\sum Cb(i) \times W(i)}{\sum W(i)};$$

assign a numerical value to a G channel gain CgAvg of the to-be-detected image; wherein i denotes an $i^{th}$ statistical point within a cluster, W(i) denotes the weight value of the $i^{th}$ statistical point, Cr(i) denotes a value obtained by dividing the response value of Component G of the $i^{th}$ statistical point by the response value of Component R of the $i^{th}$ statistical point, and Cb(i) denotes a value obtained by dividing the response value of Component G of the $i^{th}$ statistical point by the response value of Component B of the $i^{th}$ statistical point.

11. The apparatus according to claim 9, wherein when allocating the weight value for the statistical points within the target cluster according to the clustering feature, the machine-executable instructions further cause the processor to:

in case that the clustering feature indicates there is only one target cluster within the white region, allocate an identical weight value for the statistical points within the target cluster; and in case that the clustering feature indicates there are at least two target clusters within the white region, allocate weight values for the statistical points within the target clusters according to a weighting parameter, such that the statistical points within the same target cluster have the same weight value and the statistical points within different target clusters have different weight values.

12. The apparatus according to claim 11, wherein the weighting parameter comprises one or more of the following:

the number of statistical points within a cluster;

a color temperature corresponding to a center position of the cluster; and a distance relation between the center position of the cluster and a blackbody locus curve.

13. The apparatus according to claim 12, wherein when allocating weight values for the statistical points within the target clusters according to the weighting parameter, the machine-executable instructions further cause the processor to:

allocate a larger weight value for the statistical points within a target cluster as there are more statistical points in the target cluster;

allocate a larger weight value for the statistical points within a target cluster as the color temperature corresponding to the center position of the target cluster becomes closer to a common color temperature section of a light source; and allocate a larger weight value for the statistical points within a target cluster as the center position of the target cluster becomes nearer to the blackbody locus curve.

* * * * *